(12) United States Patent
Hakiri et al.

(10) Patent No.: US 8,770,735 B2
(45) Date of Patent: Jul. 8, 2014

(54) INKJET RECORDING INK AND INK CARTRIDGE

(75) Inventors: Minoru Hakiri, Shizuoka (JP); Shin Hasegawa, Shizuoka (JP); Hiroyuki Fushimi, Shizuoka (JP); Mitsuru Naruse, Shizuoka (JP); Naoya Morohoshi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 206 days.

(21) Appl. No.: 13/391,905

(22) PCT Filed: Sep. 6, 2010

(86) PCT No.: PCT/JP2010/065679
§ 371 (c)(1),
(2), (4) Date: Feb. 23, 2012

(87) PCT Pub. No.: WO2011/030880
PCT Pub. Date: Mar. 17, 2011

(65) Prior Publication Data
US 2012/0154492 A1     Jun. 21, 2012

(30) Foreign Application Priority Data

Sep. 9, 2009  (JP) ................... 2009-208593

(51) Int. Cl.
*B41J 2/01* (2006.01)
*B41J 2/21* (2006.01)
*B41J 2/175* (2006.01)
*C09D 11/00* (2014.01)

(52) U.S. Cl.
CPC ............ *B41J 2/2107* (2013.01); *B41J 2/17503* (2013.01); *C09D 11/324* (2013.01)
USPC ............................. 347/100; 347/95; 106/31.6

(58) Field of Classification Search
CPC .............. B41J 2/01; B41J 2/21; B41J 2/2107; B41J 2/17503; C09D 11/32; C09D 11/322; C09D 11/324; C09D 11/40
USPC ................ 347/21, 28, 95–100; 523/160, 161; 106/31.13, 31.6
See application file for complete search history.

(56) References Cited

U.S. PATENT DOCUMENTS 5,085,698 A   2/1992  Ma et al.
5,172,133 A   12/1992  Suga et al.
(Continued)

FOREIGN PATENT DOCUMENTS

JP   56 147871   11/1981
JP   5 239392    9/1993
(Continued)

OTHER PUBLICATIONS

International Search Report Issued Nov. 2, 2010 in PCT/JP10/65679 Filed Sep. 6, 2010.

*Primary Examiner* — Matthew Luu
*Assistant Examiner* — Rut Patel
(74) *Attorney, Agent, or Firm* — Oblon, Spivak, McClelland, Maier & Neustadt, L.L.P.

(57) ABSTRACT

An inkjet recording ink including a pigment dispersion liquid containing at least a first carbon black and a dispersant, a second carbon black, a penetrant, a wetting agent and water, wherein the first carbon black has an average particle diameter D50 of 70 nm to 180 nm as measured by a dynamic light scattering method and has a particle diameter standard deviation equal to or smaller than ½ of the average particle diameter, wherein the dispersant is a condensate of naphthalene sulfonic acid and formalin, wherein the second carbon black is carbon black coated with a resin, and wherein the penetrant is a 2-ethyl-1,3-hexandiol.

16 Claims, 1 Drawing Sheet

(56) References Cited

U.S. PATENT DOCUMENTS

| | | | |
|---|---|---|---|
| 5,221,334 A | 6/1993 | Ma et al. | |
| 5,571,311 A | 11/1996 | Belmont et al. | |
| 6,710,022 B1 | 3/2004 | Kwetkat et al. | |
| 6,758,559 B1 | 7/2004 | Nakano et al. | |
| 6,786,959 B2 | 9/2004 | Hakiri et al. | |
| 7,101,919 B2 | 9/2006 | Hasegawa et al. | |
| 7,490,930 B2 | 2/2009 | Morohoshi et al. | |
| 7,798,629 B2 | 9/2010 | Hakiri et al. | |
| 7,815,301 B2 | 10/2010 | Hasegawa et al. | |
| 7,892,340 B2 | 2/2011 | Namba et al. | |
| 7,919,544 B2 | 4/2011 | Matsuyama et al. | |
| 7,938,527 B2 | 5/2011 | Ohshima et al. | |
| 8,083,342 B2 | 12/2011 | Morohoshi et al. | |
| 8,096,651 B2 | 1/2012 | Ohshima et al. | |
| 2006/0272543 A1 | 12/2006 | Hakiri et al. | |
| 2007/0197685 A1 | 8/2007 | Aruga et al. | |
| 2008/0036830 A1 | 2/2008 | Natori et al. | |
| 2008/0273045 A1* | 11/2008 | Morohoshi et al. | 346/135.1 |
| 2009/0114121 A1 | 5/2009 | Morohoshi et al. | |
| 2009/0130313 A1 | 5/2009 | Ohshima et al. | |
| 2009/0162569 A1 | 6/2009 | Morohoshi et al. | |
| 2009/0186162 A1 | 7/2009 | Namba et al. | |
| 2009/0263632 A1 | 10/2009 | Kojima et al. | |
| 2009/0291213 A1 | 11/2009 | Ohshima et al. | |
| 2010/0302326 A1 | 12/2010 | Morohoshi et al. | |

FOREIGN PATENT DOCUMENTS

| | | |
|---|---|---|
| JP | 8 3498 | 1/1996 |
| JP | 8 81646 | 3/1996 |
| JP | 8 283633 | 10/1996 |
| JP | 8 333531 | 12/1996 |
| JP | 9 194775 | 7/1997 |
| JP | 2000 63727 | 2/2000 |
| JP | 2000 144028 | 5/2000 |
| JP | 2001 81366 | 3/2001 |
| JP | 2001 123097 | 5/2001 |
| JP | 2002 3767 | 1/2002 |
| JP | 2003 509571 | 3/2003 |
| JP | 2004 123904 | 4/2004 |
| JP | 3625595 | 12/2004 |
| JP | 2005 105227 | 4/2005 |
| JP | 2005 281691 | 10/2005 |
| JP | 2005 314528 | 11/2005 |
| JP | 2006 8858 | 1/2006 |
| JP | 2006 188626 | 7/2006 |
| JP | 2006 219584 | 8/2006 |
| JP | 2006 282781 | 10/2006 |
| JP | 2006 321895 | 11/2006 |
| JP | 2007 119551 | 5/2007 |
| JP | 2007 186642 | 7/2007 |
| JP | 2009 149815 | 7/2009 |
| JP | 2009 173805 | 8/2009 |
| WO | WO 2009081998 A1 * | 7/2009 |
| WO | WO 2009093751 A1 * | 7/2009 |

* cited by examiner

INKJET RECORDING INK AND INK CARTRIDGE

This application is a 371 of PCT/JP2010/065679 filed Sep. 6, 2010. Priority to Japanese patent application 2009-208593, filed Sep. 9, 2009, is claimed.

TECHNICAL FIELD

The present invention relates to an inkjet recording ink attaining high image density, excelling in jetting stability, and excelling in ink liquid storage stability.

BACKGROUND ART

Compared to other printing methods, the inkjet recording method offers ease of full-color printing since it involves a simpler process. And also, the inkjet recording method has the benefit of enabling the production of high-resolution images despite being of simple constitution.

As inkjet recording inks, dye-based inks are used in which various types of water-soluble dyes are dissolved in water or a mixture of water and an organic solvent. Such dye-based inks have a disadvantage of having poor light resistance, though they are excellent in color tone sharpness. Meanwhile, pigment-based inks in which carbon black and various types of organic pigments are dispersed are superior in light resistance compared to dye-based inks, and thus studies on pigment-based inks are being intensively made.

However, pigment-based inks are more likely to cause nozzle clogging compared to dye-based inks. Pigment inks are generally prepared as follows. A coloring material and a dispersant are preliminarily dispersed in an aqueous solvent to prepare a dispersion product. After that, the dispersion product is dispersed to a predetermined degree by a media-type disperser, followed by diluting to a predetermined concentration.

Water-based pigment inks usually contain a surfactant and a water-soluble resin to disperse a hydrophobic pigment therein, but the reliability of images obtained using such inks is extremely low. Thus, according to some disclosed techniques, film-formable resin fine particles are added into the inks in aim of improving the quality of images. However, it is difficult to keep a plurality of components in a state of being finely and stably dispersed throughout the ink for a long period of time. And so, when a dispersant such as a surfactant is used in a large amount in order to stably disperse such fine particles, a problem inconveniently occurs. Specifically, the problem, for example, is that air bubbles may be generated inside the ink tank and/or inkjet head, which could cause degradation in image quality. Likewise, in aim of improving dispersibility, research has been conducted into the effectiveness of methods that change the surface of a pigment to a hydrophilic group, or, the effectiveness of employing a resin containing a hydrophilic group. However, while a given component may be stable when used alone, combined use of several different components has problematically caused degradation of dispersion stability as well as degradation of storage stability.

In addition, there have been reports of a surface treated pigment ink excelling in storage stability and jetting stability (PTLs 1 to 3); an ink set able to maintain a stable inkjet (PTL 4); a method of incorporating, into an ink, a water-insoluble color material and charged resin pseudo-fine particles smaller than the color material in order to attain a high image density (PTL 5); a method of incorporating a self-dispersible pigment which is defined in term of a DBP oil absorption amount (PTL 6); and an aqueous carbon black dispersion liquid containing a surface reformed carbon black and a nonionic surfactant that has an HLB value of 7 to 18 and has an acetylene skeleton (PTL 7). There is also report of an aqueous ink employing an acetylene glycol surfactant (PTL 8).

Methods for the purpose of stabilizing dispersion have been reported. Examples of these methods include a method of dispersing in water a water-dispersible resin having a carboxyl group and a nonionic hydrophilic group in its structure (PTL 9); a method of either unifying the polarities of a water-soluble polymer and a surfactant or adding nonions (PTL 10); a method of unifying the polarities of colored ion-containing polyester resin and a hydrophilic group of a colorant (PTL 11) and a method of unifying the dispersion polarities of pigment and resin fine particles (PTL 12). There is also disclosure of a printing ink employing gemini-type surfactant as a dispersant (PTL 13).

Also, there have been reports of an aqueous inkjet recording ink composition containing a pigment dispersion liquid in which at least 70% of the particles in the dispersion liquid have a diameter of less than 0.1 μm, and the other particles in the dispersion liquid have a diameter equal to or less than 0.1 μm, an aldehyde naphthalene sulfonate dispersant and/or at least one sulfone solvent (PTL 14).

In PTL 15, there is proposed a recording liquid consisting of an aqueous medium containing a pigment, a polymer dispersant and a nonionic surfactant. In PTLs 16 and 17, there is also proposed use of an AB or BAB block copolymer as a pigment dispersant. And, in PTL 18, there is proposed use of a specific pigment, a water-soluble resin and a solvent.

As a pigment dispersion method which does not use a dispersant, several methods have been disclosed. Examples of such methods include a method of introducing, into carbon black, a substituent containing a water-soluble group (PTL 19); a method of polymerizing a water-soluble monomer or the like on the surface of carbon black (PTL 20); and a method of oxidizing carbon black (PTL 21). Also, there is disclosed a method of attaining water resistance and jetting stability by incorporating, into an ink, an oxidized carbon black and a terpolymer of acrylic acid, styrene and α-methyl styrene (PTL 22).

There is also proposed an inkjet recording liquid wherein the volume average particle diameter of the dispersion particles in the inkjet recording liquid is in the range of 30 nm to 200 nm (PTL 23).

However, while ink liquids of the aforementioned conventional methods could attain high image density in the case of color pigment inks, they were not satisfactory in that they could not provide sufficient performance in the case of black color pigment inks. Also, examples of using beads of a diameter in the range of about 0.05 mm to about 1.0 mm in bead mill dispersion have been filed (PTLs 24 to 26), they do not exhibit satisfactory dispersion stability.

Also, use of an anionic surfactant as the dispersant is described in PTL 27. Although the anionic surfactant preferably has a molecular weight (m) falling within the range of $1,000 \leq m \leq 30,000$ according to the description, the anionic surfactant is considered to be unsatisfactory as far as dispersion stability is concerned. Some pigments that are vulnerable to strong shock during dispersion lack in stability after dispersion, and cause severe problems regarding jetting stability of the formed ink liquid.

CITATION LIST

Patent Literature

PTL1: Japanese Patent Application Laid-Open (JP-A) No. 2007-186642

PTL2: JP-A No. 2006-282781
PTL3: JP-A No. 2005-105227
PTL4: JP-A No. 2007-119551
PTL5: JP-A No. 2006-8858
PTL6: JP-A No. 2002-3767
PTL7: JP-A No. 2006-219584
PTL8: JP-A No. 2004-123904
PTL9: JP-A No. 05-239392
PTL10: JP-A No. 08-283633
PTL11: JP-A No. 2000-63727
PTL12: JP-A No. 2001-81366
PTL13: JP-A No. 2003-509571
PTL14: JP-A No. 08-333531
PTL15: JP-A No. 56-147871
PTL16: U.S. Pat. No. 5,085,698
PTL17: U.S. Pat. No. 5,221,334
PTL18: U.S. Pat. No. 5,172,133
PTL19: U.S. Pat. No. 5,571,311
PTL20: JP-A No. 08-81646
PTL21: JP-A No. 08-3498
PTL22: JP-A No. 09-194775
PTL23: JP-A No. 2000-144028
PTL24: JP-A No. 2005-281691
PTL25: JP-A No. 2005-314528
PTL26: JP-A No. 2006-188626
PTL27: Japanese Patent (JP-B) No. 3625595

SUMMARY OF INVENTION

Technical Problem

The present invention has been made under such circumstances and aims to provide technology relating to an inkjet recording ink that attains high image density, and excels in jetting stability and storage stability.

Solution to Problem

The present inventors conducted extensive studies and have found that the above-described problems can be solved with an inkjet recording ink which contains a pigment dispersion liquid (containing at least a first carbon black and a dispersant), a second carbon black, a penetrant, a wetting agent and water, wherein the first carbon black has an average particle diameter D50 of 70 nm to 180 nm as measured by a dynamic light scattering method and has a particle diameter standard deviation equal to or smaller than ½ of the average particle diameter, the dispersant is a condensate of naphthalene sulfonic acid and formalin, the second carbon black is carbon black coated with a resin, and the penetrant is a 2-ethyl-1,3-hexandiol.

Means for solving the above mentioned problems are as follows.

<1> An inkjet recording ink including:
a pigment dispersion liquid containing at least a first carbon black and a dispersant,
a second carbon black,
a penetrant,
a wetting agent, and
water,
wherein the first carbon black has an average particle diameter D50 of 70 nm to 180 nm as measured by a dynamic light scattering method and has a particle diameter standard deviation equal to or smaller than ½ of the average particle diameter,
wherein the dispersant is a condensate of naphthalene sulfonic acid and formalin,
wherein the second carbon black is carbon black coated with a resin, and
wherein the penetrant is 2-ethyl-1,3-hexandiol.

<2> The inkjet recording ink according to <1> above, further including a polyoxyalkylene derivative.

<3> The inkjet recording ink according to <2> above, wherein the polyoxyalkylene derivative is a polyoxyalkylene derivative represented by the following General Formula:

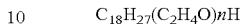
$C_{18}H_{27}(C_2H_4O)nH$ where n is in the range of 8 to 9.

<4> The inkjet recording ink according to any one of <1> to <3> above, further including an aqueous polyurethane resin.

<5> The inkjet recording ink according to <4> above, wherein the aqueous polyurethane resin is an anionic self-emulsifying ether polyurethane.

<6> The inkjet recording ink according to one of <4> and <5> above, wherein the aqueous polyurethane resin has an acid value of 40 mgKOH/g to 120 mgKOH/g.

<7> The inkjet recording ink according to any one of <1> to <6> above, wherein the amount of 2-ethyl-1,3-hexandiol is 0.1% by mass to 10% by mass.

<8> An ink cartridge including:
the inkjet recording ink according to any one of <1> to <7> above, and
a container,
wherein the inkjet recording ink is housed in the container.

Advantageous Effects of Invention

The inkjet recording ink of the present invention is superior to conventional inks in that it attains high image density, excellent jetting stability, and excellent ink liquid storage stability.

DESCRIPTION OF EMBODIMENTS

Figure 1:
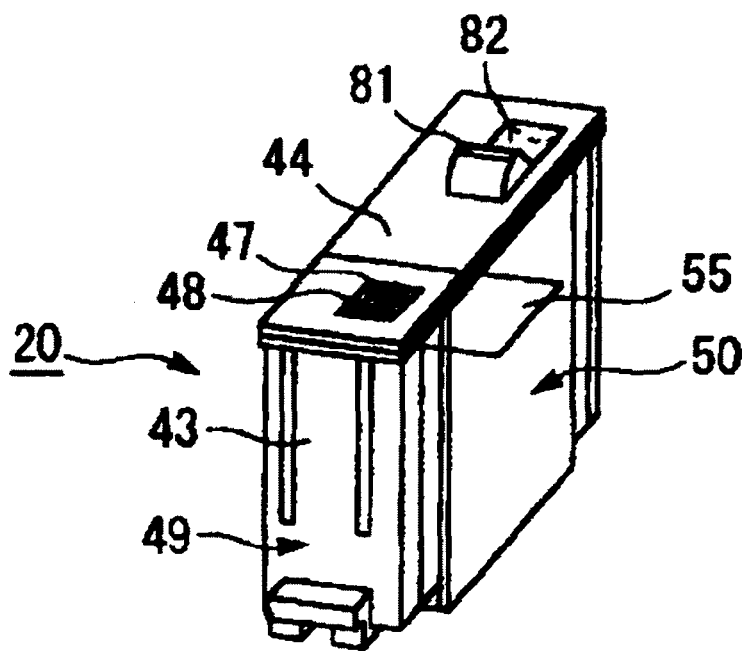
FIG. 1 is a perspective view of the schematic configuration of an ink cartridge of the present invention.

Herein below, detail description will be given with respect to the present invention.
(Inkjet Recording Ink)
The inkjet recording ink of the present invention includes a pigment dispersion liquid containing at least a first carbon black and a dispersant, a second carbon black, a penetrant, a wetting agent and water; and, if necessary, includes other components. Preferably, the inkjet recording ink contains a polyoxyalkylene derivative and aqueous polyurethane resin.
<First Carbon Black, Dispersant, and Pigment Dispersion Liquid>
In the inkjet recording ink, the ratio by mass of the dispersant to the first carbon black (regarded as 1) is preferably 0.1 to 2. The ratio is more preferably 0.25 to 1. By using the dispersant in such an amount, it is possible to provide an inkjet recording ink wherein the first carbon black has an average particle diameter (D50) of 70 nm to 180 nm and has a particle diameter standard deviation equal to or smaller than ½ of the average particle diameter. Thus, the formed inkjet recording ink can attain high image density, good jetting stability, and good storage stability.

The average particle diameter (D50) is a value which is obtained by measuring the average diameter of primary aggregates of carbon black contained in the pigment dispersion liquid or ink liquid using a particle distribution meter (manufactured by NIKKISO CO., LTD). The measurement conditions used are set forth below.
Dispersion liquid/Ink Liquid Measurement Conditions
Measuring Instrument: Particle Distribution Meter UPA150 (manufactured by NIKKISO CO., LTD)
Measurement Conditions:
1) Solid Content Concentration of Measurement Liquid: 0.1% by mass in water (solvent)
2) Transparent Particles: Yes
3) Spherical Particles: No
4) Part. Refractive Index: 1.86
5) Part. Density: 1.86 ($gm/cm^3$)
6) Fluid: Default Fluid
7) Fluid Refractive Index: 1.33
8) Viscosity High 30° C.: 0.797 cp
9) Viscosity Low 20° C.: 1.002 cp
10) Display Format: Volume Distribution On the other hand, when the amount of the dispersant is less than 0.1, it is difficult to achieve the above-described effects, and additionally, nozzle clogging tends to occur due to degradation of storage stability of the resultant pigment dispersion liquid and ink. Likewise, when the amount of the dispersant exceeds 2, inkjet printing tends to become difficult to perform since the viscosity of the pigment dispersion liquid and ink becomes too high.

The above dispersant is a condensate of naphthalene sulfonic acid and formalin.

While it is a characteristic of the present invention to use the naphthalene sulfonic acid-formalin condensate as the dispersant of the first carbon black, when the total amount of the dimer, trimer and tetramer of naphthalene sulfonic acid in the naphthalene sulfonic acid-formalin condensate is less than 20%, nozzle clogging tends to occur due to poor storage stability of the pigment dispersion liquid and ink as a result of degradation in dispersibility. Likewise, when the amount of the dimer to tetramer of naphthalene sulfonic acid in the naphthalene sulfonic acid-formalin condensate exceeds 80%, dispersion becomes difficult to perform.

The pigment dispersion liquid is obtained, for example, as follows. Specifically, the first carbon black, the dispersant, water, and optionally used various additives are dispersed with a bead mill, for example, a disperser such as DYNOMILL KDL-Type (manufactured by K.K. SHINMARU ENTERPRISES CORPORATION), AGITATOR MILL LMZ (manufactured by ASHIZAWA FINETECH LTD.) or SC MILL (manufactured by MITSUI MINING K.K.). After dispersion in the bead mill, the resultant dispersion product is further dispersed with a bead-less mill, such as high-speed shearing-force-type CLEAR SS5 (manufactured by M TECHNIQUE CO., LTD), CABITRON CD1010 (manufactured by EURO TECH, LTD), MODULE DR2000 (manufactured by K.K. SHINMARU ENTERPRISES CORPORATION), thin-film rotation-type T. K. FILMIX (manufactured by TOKUSHUKIKAKOUGYOU K.K.), super-high pressure shock-type ALTEMIZER (manufactured by SUGINO MACHINE LTD.) or NANOMIZER (manufactured by YOSHIDA KIKAI CO., LTD).

By pre-treating coarse particles with a homogenizer or the like at the stage prior to the treatment by the disperser, it is possible to sharpen the particle distribution even more, which leads to improvements in image density and jetting stability.

The beads used in the dispersers are usually ceramic beads, and generally, zirconia balls are used. The diameter of the beads is preferably 0.05 mm or less, more preferably 0.03 mm or less.

The average primary particle diameter of the first carbon black can be chosen suitably according to the intended purpose without any restriction. For example, the average primary particle diameter of the first carbon black is 10.0 nm to 30.0 nm while the BET surface area thereof is 100 $m^2/g$ to 400 $m^2/g$. More preferably, the average primary particle diameter of the first carbon black is 15.0 nm to 20.0 nm while the BET surface area thereof is 150 $m^2/g$ to 300 $m^2/g$. The term "average primary particle diameter of the carbon black" refers to an average diameter of small spherical components (components having fine crystalline profiles which are inseparable) contained in carbon black aggregate, which is obtained by measuring the diameters of the small spherical components under an electron microscope and averaging the measurements.

Since the first carbon black is vulnerable to shocks during dispersion due to being a high structure having a small average primary particle diameter, setting the beads used in the above mentioned disperser to a diameter exceeding 0.05 mm will destroy the structure due to strong shock energy among the beads which in turn leads to a loss in stability of the obtained carbon black dispersion liquid. Thus, it is preferable that the beads used have a diameter of 0.05 mm or less.

Examples of the above additional components usable include various types of surfactants (e.g., nonionic surfactants, anionic surfactants, cationic surfactants and amphoteric surfactants), water-soluble organic solvents, preservatives, pH adjusters and pH buffers.

The pigment concentration of the above pigment dispersion liquid is preferably 5% by mass to 50% by mass with respect to the total mass of the pigment dispersion liquid. Here, an amount of less than 5% by mass leads to poor productivity. While, an amount of greater than 50% leads to difficulty of dispersion since the viscosity of the formed pigment dispersion liquid becomes excessively high.

Examples of carbon black commercially available include #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600 and MCF88 (these products are manufactured by MITSUBISHI CHEMICAL CORPORATION); MONARCH 120, MONARCH 700, MONARCH 800, MONARCH 880, MONARCH 1000, MONARCH 1100, MONARCH 1300, MONARCH 1400, MOGAL L, REGAL 99R, REGAL 250R, REGAL 300R, REGAL 330R, REGAL 400R, REGAL 500R and REGAL 660R (these products are manufactured by CABOT CORPORATION); and PRINTEX A, PRINTEX G, PRINTEX U, PRINTEX V, PRINTEX 55, PRINTEX 140U, PRINTEX 140V, SPECIAL BLACK 4, SPECIAL BLACK 4A, SPECIAL BLACK 5, SPECIAL BLACK 6, SPECIAL BLACK 100, SPECIAL BLACK 250, COLOR BLACK FW1, COLOR BLACK FW2, COLOR BLACK FW2V, COLOR BLACK FW18, COLOR BLACK FW200, COLOR BLACK S150, COLOR BLACK S160 and COLOR BLACK S170 (these products are manufactured by DEGUSSA Co.).

<Second Carbon Black>

The second carbon black is carbon black coated with resin (resin-coated carbon black).

The resin-coated carbon black is generally termed "capsule pigment," and is a pigment coated with a resin. This pigment is obtained by imparting hydrophilicity to its surface in order to facilitate dispersion in water.

Examples of the resin with which carbon black is coated include polyamides, polyurethanes, polyesters, polyureas, epoxy resins, polycarbonates, urea resins, melamine resins, phenol resins, polysaccharides, gelatin, gum arabic, dextran, casein, proteins, natural rubbers, carboxypolymethylenes, polyvinyl alcohols, polyvinyl pyrrolidones, polyvinyl acetates, polyvinyl chlorides, polyvinylidene chlorides, cellulose, ethyl cellulose, methyl cellulose, nitro cellulose, hydroxyethyl cellulose, cellulose acetate, polyethylenes, polystyrenes, (meth)acrylic acid polymers or copolymers, (meth)acrylate polymers or copolymers, (meth)acrylic acid-(meth)acrylate copolymers, styrene-(meth)acrylic acid copolymers, styrene-maleic acid copolymers, sodium alginate, fatty acids, paraffins, beeswax, water wax, hardened beef tallow, carnauba wax and albumin.

Further examples thereof include organic polymers containing an anionic group such as a carboxylic group or a sulfonic group; and nonionic organic polymers. Examples of the nonionic organic polymers include polyvinyl alcohols, polyethylene glycol monomethacrylates, polypropylene glycol monomethacrylates, methoxy polyethylene glycol monomethacrylates and (co)polymers thereof; and cation ring-opening polymers such as 2-oxazolines.

The method of coating the pigment with the resin is not particularly limited and may be appropriately selected depending on the intended purpose. Examples thereof include methods described in JP-B No. 4138214, and JP-A Nos. 2010-095713 and 2008-260926.

<Penetrant>

The above penetrant may be selected according to the intended purpose without any restriction. Preferable examples of the penetrant include 2-ethyl-1,3-hexandiol, 2,2, 4-trimethyl-1,3-pentandiol and 2,2-dimethyl-1,3-propandiol. Among these, 2-ethyl-1,3-hexandiol are more preferable. By using 2-ethyl-1,3-hexandiol, it is possible to eliminate bleeding by increasing the permeability of the ink as well as confining the pigment to the surface (of paper) and thus attain a printed image of high image density and a low degree of print-through. In addition, it has been found that, by combining the penetrant with a mixed system (mixture) of the above mentioned pigments, jetting stability can also be improved.

The amount of the above penetrant is preferably 0.1% by mass to 10.0% by mass, more preferably 1.5% by mass to 5.0% by mass, with respect to the total mass of the ink liquid. When the amount is less than 0.1% by mass, the effects of the penetrant cannot be obtained sufficiently. Whereas when the amount exceeds 10.0% by mass, the solubility of the penetrant itself decreases, and thus reliability will be poor.

<Wetting Agent>

Examples of the wetting agent include polyalcohols (e.g., ethylene glycol, diethylene glycol, 1,3-butylene glycol, 3-methyl-1,3-butylene glycol, triethylene glycol, polyethylene glycol, polypropylene glycol, 1,5-pentandiol, 1,6-hexandiol, glycerin, 1,2,6-hexantriol, 1,2,4-butantriol, 1,2,3-butantriol and petriol), polyalcohol alkyl ethers (e.g., ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether), polyalcohol aryl ethers (e.g., ethylene glycol monophenyl ether and ethylene glycol monobenzyl ether), nitrogen-containing heterocyclic compounds (e.g., 2-pyrrolidone, N-methyl-2-pyrrolidone, N-hydroxyethyl-2-pyrrolidone, 1,3-dimethyl imidazolidinone, ε-caprolactam and γ-butyrolactone), amides (e.g., formamide, N-methyl formamide and N,N-dimethyl formamide), sulfur-containing compounds (e.g., monoethanol amine, diethanol amine, triethanol amine, monoethyl amine, diethyl amine, amines such as triethyl amine, dimethyl sulfoxide, sulfolane and thiodiethanol) propylene carbonate and ethylene carbonate.

Among these, incorporation of at least one of 1,3-butyl glycol, diethylene glycol, triethylene glycol and glycerin attains the excellent effects of preventing clogging (i.e., poor spraying characteristics caused by moisture evaporation) due to drying of the ink and improving saturation of images formed by the present invention.

The amount of the wetting agent is, for example, 0% by mass to 50% by mass with respect to the total mass of the ink, more preferably 5% by mass to 40% by mass, even more preferably 10% by mass to 35% by mass.

<Polyoxyalkylene Derivative>

The polyoxyalkylene derivative is not particularly limited and may be appropriately selected depending on the intended purpose. It is preferable to use a polyoxyalkylene derivative represented by following General Formula: $C_{18}H_{27}(C_2H_4O)$ nH. In this General Formula, "n" is preferably in the range of 8 to 9. When n is less than 8, permeability increases which in turn causes bleeding and sharpness of the image to become bad and also produces bad influence on jetting stability. When n exceeds 9, permeability decreases to produce bad influences such as poor embedding of the image. Both cases are not preferred.

Examples of commercially available products of the polyoxyalkylene derivative include SOFTAL EP-7025, SOFTAL EP-5035 and SOFTAL EP-9050 (these products are manufactured by NIPPON SHOKUBAI CO., LTD.), OA-611, OA-613 and OA-615 (these products are manufactured by NOF CORPORATION) and EMULGEN LS-106 (manufactured by Kao Corporation).

<Aqueous Polyurethane Resin>

The aqueous polyurethane resin is not particularly limited and may be appropriately selected depending on the intended purpose. The aqueous polyurethane resin is preferably a water-dispersible polyurethane resin.

Here, the "polyurethane resin" refers to a polymer composed of a diisocyanate compound and a diol compound and having, as the backbone, a polyurethane skeleton formed of a plurality of urethane bonds.

The water-dispersible polyurethane resin generally used is obtained by introducing into the polyurethane backbone a hydrophilic moiety necessary for stable dispersion in water, or a polyurethane resin dispersed in water with an external emulsifying agent. More preferably, the water-dispersible polyurethane resin is those of self-dispersing type containing the hydrophilic group introduced into the backbone (self-emulsifying polyurethane resins).

The self-emulsifying polyurethane resin is not particularly limited and may be appropriately selected depending on the intended purpose. Examples thereof include various water-dispersible polyurethane resins such as ester-based polyurethanes, ether-based polyurethanes and carbonate-based polyurethanes. These water-dispersible polyurethane resins can be obtained by reacting together (i) a diisocyanate compound, (ii) a diol compound such as a polyether diol, a polyester diol or a polycarbonate diol, (iii) an acid group-containing diol such as a carboxylic acid group-containing diol or a sulfonic acid group-containing diol. Among them, anionic self-emulsifying ether polyurethanes are preferred.

Examples of the anionic self-emulsifying ether polyurethane include those described in, for example, JP-A Nos. 2009-67907, 2009-173805 and 2009-161726.

A dispersion liquid obtained by dispersing carbon black (used in a black pigment ink) together with a polyurethane resin is stabilized as compared to that obtained by dispersing carbon black sole. Although the reason for this is unclear, this is likely because the polyurethane resin surrounds carbon black particles to form protective colloids.

The method of synthesizing the aqueous polyurethane resin is not particularly limited and may be appropriately selected depending on the intended purpose. Examples thereof include the following methods.

(1) A method including reacting together a polyfunctional isocyanate compound; at least one of a compound having two or more active hydrogen-containing groups reactable with an isocyanate group, and a compound having an active hydrogen-containing group reactable with an isocyanate group and having a carboxyl group and a sulfonyl group in the molecule thereof; and a compound having an active hydrogen-containing group reactable with an isocyanate group and having a cationic group in the molecule thereof at such an equivalence ratio that the isocyanate group is excessive in the presence or absence of an organic solvent, to thereby produce a urethane polymer having an isocyanate group at the end thereof, neutralizing at least one of the carboxyl group and sulfonyl group in the urethane polymer with a neutralizing agent, charging the thus-neutralized urethane polymer into an aqueous solution containing a chain extender, emulsifying and performing chain extension reaction, and removing the optionally used organic solvent from the reaction system, to thereby obtain an aqueous polyurethane resin.

(2) A method including charging the urethane polymer before neutralization obtained in the method described in (1) into an aqueous solution containing a neutralizing agent and a chain extender, and emulsifying and performing chain extension reaction to obtain an aqueous polyurethane resin.

(3) A method including adding a chain extender and water to the neutralized urethane polymer obtained in the method described in (1), to thereby obtain an aqueous polyurethane resin.

(4) A method including adding a neutralizing agent, a chain extender and water to the urethane polymer before neutralization obtained in the method described in (1), to thereby obtain an aqueous polyurethane resin.

(5) A method including charging into water the neutralized urethane polymer obtained in the method described in (1), and emulsifying and adding a chain extender thereto, to thereby obtain an aqueous polyurethane resin.

(6) A method including charging the urethane polymer before neutralization obtained in the method described in (1) into an aqueous solution containing a neutralizing agent, and adding a chain extender thereto, to thereby obtain an aqueous polyurethane resin.

(7) A method including adding water and a chain extender sequentially to the neutralized urethane polymer obtained in the method described in (1), to thereby obtain an aqueous polyurethane resin.

(8) A method including adding an aqueous solution containing a neutralizing agent to the urethane polymer before neutralization obtained in the method described in (1), and adding a chain extender thereto, to thereby obtain an aqueous polyurethane resin.

The acid value of the aqueous polyurethane resin is preferably in the range of 40 mgKOH/g to 120 mgKOH/g. If the acid value is less than 40 mgKOH/g, the storage stability of the ink becomes poor; whereas when the acid value exceeds 120 mgKOH/g, the viscosity becomes high which leads to poor jetting stability. Both cases are not preferred. The acid value is indicated by milligrams (mg) of potassium hydroxide necessary for the neutralization of free fatty acids contained in 1 g of fat. Alternatively, the acid value is measured according to JIS K2501.

<Other Components>

The inkjet recording ink may contain other components such as water, the materials described as additives to the pigment dispersion liquid described above, as well as water-soluble organic solvents. Examples of the water-soluble organic solvent include alcohols such as methanol, ethanol, 1-propanol and 2-propanol; polyalcohols, pyrrolidone derivatives such as N-methylpyrrolidone, ketones such as acetone and methyl ethyl, and alkanol amines.

The inkjet recording ink is obtained by known methods. One employable known method includes agitating and mixing together the above-described pigment dispersion liquid, the second carbon black, water, and the water-soluble organic solvent; filtrating the resultant mixture with, for example, a filter or a centrifugal machine; and optional degassing.

The amount of the carbon black contained in the inkjet recording ink is preferably 1% by mass to 20% by mass with respect to the total mass of the inkjet recording ink. When the amount is less than 1% by mass, image density is low which degrades the sharpness of images. When the amount exceeds 20% by mass, the ink viscosity tends to be high, and nozzle clogging readily occurs.

The inkjet recording ink obtained in the manner set forth above is able to retain water and moistness, which, as a result, realizes excellent storage stability since there is no aggregation of colorants and no increase in viscosity even when the inkjet recording ink is stored for long a period of time. And it is also possible to realize an inkjet recording ink capable of maintaining fluidity at dried portions even in cases in which the nozzle tips or the like of inkjet printers are left in an opened state. Also, there are no occurrences of nozzle clogging in cases of restarting during or immediately after printing, making it possible to attain high jetting stability.

(Ink Cartridge)

The inkjet recording ink of the present invention obtained in this manner is suited to use with an ink cartridge configured to contain it.

Figure 2:
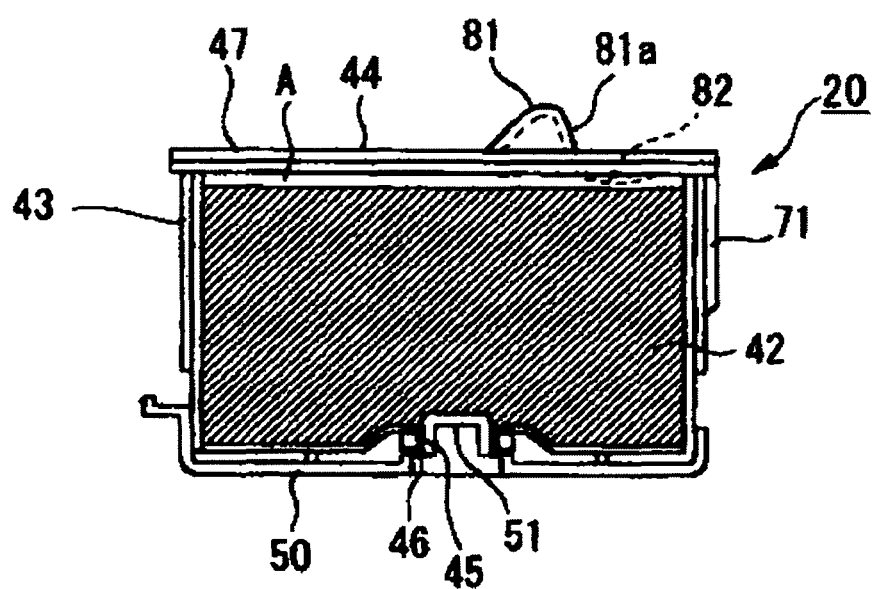
FIG. 2 is a front cross-sectional view of the schematic internal configuration of an ink cartridge of the present invention.

FIG. 1 is a perspective view of the schematic configuration of the ink cartridge of the present invention. FIG. 2 is a front cross-sectional view of the schematic internal configuration of the ink cartridge of the present invention.

As illustrated in FIGS. 1 and 2, an ink cartridge 20 includes a cartridge housing 49 and a liquid absorber 42 contained therein. The liquid absorber 42 is a porous material which has absorbed the inkjet recording ink of the present invention. The cartridge housing 49 contains a case 43 and an upper covering member 44 provided on the large, top opening of the case. The symbol "A" denotes a space. Further, the upper covering member 44 is provided with a port open to atmosphere (atmosphere-opened port) 47 having grooves 48 and a cartridge-detaching protrusion 81. Reference numeral 55 denotes a seal member for the atmosphere-opened port 47. Also, the case 43 of the cartridge housing 49 has at the bottom a liquid-supplying port 45 for supplying each liquid to an unillustrated recording head. A seal ring 46 is fitted into peripheral portions of the liquid-supplying port 45. In order for the ink cartridge to be prevented from leaking the liquid before mounted to an image forming apparatus, the cartridge housing 49 is provided with a cap member 50 which has a liquid leakage-preventing protrusion 51 for sealing the liquid-supplying port 45. Notably, reference numeral 71 denotes a cartridge-positioning portion, reference numeral 81a denotes a cartridge-detaching hook, and reference numeral 82 denotes a cartridge-detaching dent.

Images can be formed by using an inkjet printing device for forming images to jet for recording (printing) the inkjet recording ink of the present invention onto an image supporting medium such as paper. Examples of printing methods include continuous spray type printing as well as on-demand type printing. Examples of the on-demand type printing methods include the piezo method, the thermal method and the electrostatic method.

EXAMPLES

The present invention will be described in detail by way of Examples and Comparative Examples, but should not be construed as being limited to Examples. The units referred to as "parts" in the following Examples are units by mass.

Preparation Example 1

Preparation of Pigment Dispersion Liquid (A)

Formulation
Carbon Black: 200 parts
NIPEX150-IQ (Manufactured by DEGUSSA: Gas Black)
Naphthalene sulfonate acid-formalin condensate: 50 parts
(Total amount of dimers, trimers and tetramers of naphthalene sulfonate acid: 30%)
[PIONIN A-45-PN, manufactured by TAKEMOTO OIL & FAT CO., LTD]
Distilled Water: 750 parts The above-listed components were pre-mixed and then dispersed for 15 minutes at a liquid temperature of 30° C. at a rotational speed of 100 m/s using a bead mill disperser (UAM-015, manufactured by KOTOBUKU INDUSTRIES CO., LTD) using zirconia beads (density $6.03 \times 10^{-6}$ $g/m^2$) having a diameter of 0.03 mm. After this, coarse particles were separated from the mixture using a centrifuge machine (Model-3600, manufactured by KUBOTA CORPORATION), to thus prepare pigment dispersion liquid (A) having carbon black having an average particle diameter of 121.4 nm and a standard deviation of 48.3 nm.

Preparation Example 2

Preparation of Pigment Dispersion Liquid (B)
(Resin-Coated Carbon Dispersion Liquid (B)

—Preparation of Polymer Solution—

First, a 1 L-flask equipped with a mechanical agitator, a thermometer, a nitrogen gas induction tube, a refluxing tube, and a dropping funnel was thoroughly purged with nitrogen gas. Next, 11.2 g of styrene, 2.8 g of acrylic acid, 12.0 g of lauryl methacrylate, 4.0 g of polyethylene glycol methacrylate, 4.0 g of styrene macromer (trade name: AS-6, manufactured by TOUAGOUSEI CO., LTD), and 0.4 g of mercapto ethanol were charged in the flask and heated to 65° C. Next, a liquid mixture of 100.8 g of styrene, 25.2 g of acrylic acid, 108.0 g of lauryl methacrylate, 36.0 g of polyethylene glycol methacrylate, 60.0 g of hydroxylethyl methacrylate, 36.0 g of styrene macromer (trade name: AS-6, manufactured by TOUAGOU CO., LTD), 3.6 g of mercapto ethanol, 2.4 g of azobisdimethyl(valeronitrile) and 18 g of methyl ethyl ketone was added dropwise to the flask for 2.5 hours. After completion of dropwise addition, a liquid mixture of 0.8 g of azobisdimethyl(valeronitrile) and 18 g of methyl ethyl ketone was added dropwise to the flask for 0.5 hours. The resultant mixture was then matured for 1 hour at 65° C. Thereafter, 0.8 g of azobisdimethyl(valeronitrile) was added to the flask, followed by maturing for 1 hour. After completion of reaction, 364 g of methyl ethyl ketone was added thereto, to thereby prepare 800 g of a polymer solution having a concentration of 50% by mass.

—Preparation of Resin-Coated Carbon Black and Preparation of Pigment Dispersion Liquid (B)—

Twenty eight grams of the above-prepared polymer solution, 26 g of carbon black, 13.6 g of a 1 mol/L potassium hydroxide solution, 20 g of methyl ethyl ketone and 30 g of ion exchange water were thoroughly agitated and then kneaded with a three roll mill (MIXING ROLL MILL, manufactured by INOUE MANUFACTURING CO., LTD.). The resultant paste was put into 200 g of ion exchange water, followed by thorough agitation. Thereafter, the methyl ethyl ketone and water were evaporated away using an evaporator, to thereby prepare a polymer fine particle dispersion of carbon black (pigment dispersion liquid (B)).

Preparation Example 3

Preparation of Pigment Dispersion Liquid (C)

Pigment dispersion liquid (C) was prepared in the same manner as in Preparation Example 1 except that HAITENOL18E (anionic surfactant, manufactured by DAIICHI KOUGYOU SEIYAKU CO., LTD) was used as the naphthalene acid-sulfonate condensate.

Preparation Example 4

Preparation of Pigment Dispersion Liquid (D)

Pigment dispersion liquid (D) was prepared in the same manner as in Preparation Example 1 except that the carbon black was changed to carbon black (NIPEX-180, manufactured by degussa) and that the dispersion time was changed to 25 minutes.

In the thus-prepared pigment dispersion liquid (D), the solid content concentration was 25% by mass, and the pigment concentration was 20% by mass.

The carbon black contained in pigment dispersion liquid (D) was found to have an average particle diameter of 72.3 nm and a standard deviation of 31.4 nm.

Preparation Example 5

Preparation of Pigment Dispersion Liquid (E)

Pigment dispersion liquid (E) was prepared in the same manner as in Preparation Example 1 except that the carbon black was changed to carbon black (NIPEX-60, manufactured by degussa) and that the dispersion time was changed to 8 minutes.

In the thus-prepared pigment dispersion liquid (E), the solid content concentration was 25% by mass, and the pigment concentration was 20% by mass.

The carbon black contained in pigment dispersion liquid (E) was found to have an average particle diameter of 176.2 nm and a standard deviation of 69.5 nm.

Preparation Example 6

Preparation of Pigment Dispersion Liquid (F)

Pigment dispersion liquid (F) was prepared in the same manner as in Preparation Example 1 except that the carbon black was changed to carbon black (NIPEX-60, manufactured by degussa) and that the dispersion time was changed to 5 minutes.

In the thus-prepared pigment dispersion liquid (F), the solid content concentration was 25% by mass, and the pigment concentration was 20% by mass.

The carbon black contained in pigment dispersion liquid (F) was found to have an average particle diameter of 189.6 nm and a standard deviation of 70.8 nm.

Preparation Example 7

Preparation of Pigment Dispersion Liquid (G)

Pigment dispersion liquid (G) was prepared in the same manner as in Preparation Example 1 except that the carbon black was changed to carbon black (Printex 95, manufactured by degussa).

In the thus-prepared pigment dispersion liquid (G), the solid content concentration was 25% by mass, and the pigment concentration was 20% by mass.

The carbon black contained in pigment dispersion liquid (G) was found to have an average particle diameter of 178.3 nm and a standard deviation of 98.3 nm.

Preparation Example 8

Preparation of Pigment Dispersion Liquid (H)

Pigment dispersion liquid (H) was prepared in the same manner as in Preparation Example 1 except that the carbon black was changed to carbon black (NIPEX-180, manufactured by degussa) and that the dispersion time was changed to 35 minutes.

In the thus-prepared pigment dispersion liquid (H), the solid content concentration was 25% by mass, and the pigment concentration was 20% by mass.

The carbon black contained in pigment dispersion liquid (H) was found to have an average particle diameter of 58.2 nm and a standard deviation of 26.3 nm.

Example 1

Preparation of Ink Liquid (a)

Formulation

Pigment Dispersion Liquid (A) (Solid Content Concentration: 20% by mass): 25 parts Resin-Coated Carbon Dispersion Liquid (B) (Solid Content Concentration: 20% by mass): 25 parts Glycerin: 7.5 parts Diethylene Glycol: 22.5 parts 2-Ethyl-1,3-hexandiol: 3.0 parts Polyoxyalkylene Derivative General Formula: $C_{18}H_{27}(C_2H_4O)nH$ (n=8): 3.0 parts W5661 (anionic self-emulsifying ether polyurethane, manufactured by Mitsui Chemicals, Inc.): 2.0 parts (acid value: 48 mgKOH/g, weight average molecular weight: 20,000, average particle diameter: 11.0 nm)

Distilled Water: 12.0 parts

After the above components had been agitated for 30 minutes, the resultant mixture was filtrated with a membrane filter having a pore size of 0.8 μm, and degassed in vacuum, to thereby prepare ink liquid (a).

Example 2

Preparation of Ink Liquid (b)

Ink liquid (b) was prepared in the same manner as in Example 1 except that the polyoxyalkylene derivative ($C_{18}H_{27}(C_2H_4O)nH$ where n=8) was not used and that the amount of the distilled water was increased by 3.0 parts.

Example 3

Preparation of Ink Liquid (c)

Ink liquid (c) was prepared in the same manner as in Example 1 except that W5661 was not used and that the amount of the distilled water was increased by 2.0 parts.

Comparative Example 1

Preparation of Ink Liquid (d)

Comparative ink liquid (d) was prepared in the same manner as in Example 1 except that pigment dispersion liquid (A) was changed to pigment dispersion liquid (C), that 2-ethyl-1,3-hexandiol was changed to sodium polyoxyethylene (3) tridecyl ether acetate, and that the polyoxyalkylene derivative was changed to FS-300 (fluorine-containing surfactant) manufactured by DUPONT.

Comparative Example 2

Preparation of Ink Liquid (e)

Comparative ink liquid (e) was prepared in the same manner as in Example 1 except that resin-coated carbon dispersion liquid (B) was not used and that the amount of the distilled water was increased by 25 parts.

Comparative Example 3

Preparation of Ink Liquid (f)

Comparative ink liquid (f) was prepared in the same manner as in Example 1 except that pigment dispersion liquid (A) was not used and that the amount of the distilled water was increased by 25 parts.

Example 4

Preparation of Ink Liquid (g)

Ink liquid (g) was prepared in the same manner as in Example 1 except that the polyoxyalkylene derivative and W5661 (anionic self-emulsifying ether polyurethane, manufactured by Mitsui Chemicals, Inc.) were not used and that the amount of the distilled water was changed from 12.0 parts to 17.0 parts.

Example 5

Preparation of Ink Liquid (h)

Ink liquid (h) was prepared in the same manner as in Example 1 except that pigment dispersion liquid (A) was changed to pigment dispersion liquid (D).

Example 6

Preparation of Ink Liquid (i)

Ink liquid (i) was prepared in the same manner as in Example 1 except that pigment dispersion liquid (A) was changed to pigment dispersion liquid (E).

Comparative Example 4

Preparation of Ink Liquid (j)

Ink liquid (j) was prepared in the same manner as in Example 1 except that pigment dispersion liquid (A) was changed to pigment dispersion liquid (F).

Comparative Example 5

Preparation of Ink Liquid (k)

Ink liquid (k) was prepared in the same manner as in Example 1 except that pigment dispersion liquid (A) was changed to pigment dispersion liquid (G).

Comparative Example 6

Preparation of Ink Liquid (l)

Ink liquid (l) was prepared in the same manner as in Example 1 except that pigment dispersion liquid (A) was changed to pigment dispersion liquid (H).

Comparative Example 7

Preparation of Ink Liquid (m)

Ink liquid (m) was prepared in the same manner as in Example 1 except that pigment dispersion liquid (A) was changed to pigment dispersion liquid (C).

Comparative Example 8

Preparation of Ink Liquid (n)

Ink liquid (n) was prepared in the same manner as in Example 1 except that 2-ethyl-1,3-hexanediol was changed to sodium polyoxyethylene (3) tridecyl ether acetate.

Example 7

Preparation of Ink Liquid (o)

Ink liquid (o) was prepared in the same manner as in Example 1 except that the polyoxyalkylene derivative was changed to FS-300 (fluorine-containing surfactant) manufactured by DUPONT.

Example 8

Preparation of Ink Liquid (p)

Ink liquid (p) was prepared in the same manner as in Example 1 except that the anionic self-emulsifying ether polyurethane was changed to an anionic self-emulsifying ether polyurethane having an acid value of 37 mgKOH/g (manufactured by Mitsui Chemicals, Inc.).

Notably, the anionic self-emulsifying ether polyurethane having an acid value of 37 mgKOH/g was synthesized by reacting a diisocyanate compound with a polyol containing a polyether diol as a main component. The acid value was adjusted by controlling the amounts of the functional groups (carboxyl group and amino group) contained in the polyol.

Example 9

Preparation of Ink Liquid (q)

Ink liquid (q) was prepared in the same manner as in Example 1 except that the anionic self-emulsifying ether polyurethane was changed to an anionic self-emulsifying ether polyurethane having an acid value of 128 mgKOH/g (manufactured by Mitsui Chemicals, Inc.).

Notably, the anionic self-emulsifying ether polyurethane having an acid value of 128 mgKOH/g was synthesized by reacting a diisocyanate compound with a polyol containing a polyether diol as a main component. The acid value was adjusted by controlling the amounts of the functional groups (carboxyl group and amino group) contained in the polyol.

Example 10

Preparation of Ink Liquid (r)

Ink liquid (r) was prepared in the same manner as in Example 1 except that the amount of 2-ethyl-1,3-hexanediol was changed from 3.0 parts to 0.05 parts and that the amount of the distilled water was changed from 12.0 parts to 14.95 parts.

Example 11

Preparation of Ink Liquid (s)

Ink liquid (s) was prepared in the same manner as in Example 1 except that the amount of 2-ethyl-1,3-hexanediol was changed from 3.0 parts to 12.0 parts and that the amount of the distilled water was changed from 12.0 parts to 3.0 parts.

Example 12

Preparation of Ink Liquid (t)

Ink liquid (t) was prepared in the same manner as in Example 1 except that the amount of 2-ethyl-1,3-hexanediol was changed from 3.0 parts to 0.1 parts and that the amount of the distilled water was changed from 12.0 parts to 14.9 parts.

Example 13

Preparation of Ink Liquid (u)

Ink liquid (u) was prepared in the same manner as in Example 1 except that the amount of 2-ethyl-1,3-hexandiol was changed from 3.0 parts to 10 parts and that the amount of the distilled water was changed from 12.0 parts to 5.0 parts.

Example 14

Preparation of Ink Liquid (v)

Ink liquid (v) was prepared in the same manner as in Example 1 except that the amount of 2-ethyl-1,3-hexandiol was changed from 3.0 parts to 1.5 parts and that the amount of the distilled water was changed from 12.0 parts to 13.5 parts.

Example 15

Preparation of Ink Liquid (w)

Ink liquid (w) was prepared in the same manner as in Example 1 except that the amount of 2-ethyl-1,3-hexandiol was changed from 3.0 parts to 5.0 parts and that the amount of the distilled water was changed from 12.0 parts to 10.0 parts.

Example 16

Preparation of Ink Liquid (x)

Ink liquid (x) was prepared in the same manner as in Example 1 except that the anionic self-emulsifying ether polyurethane was changed to an anionic self-emulsifying ether polyurethane having an acid value of 40 mgKOH/g (manufactured by Mitsui Chemicals, Inc.).

Notably, the anionic self-emulsifying ether polyurethane having an acid value of 40 mgKOH/g was synthesized by reacting a diisocyanate compound with a polyol containing a polyether diol as a main component. The acid value was adjusted by controlling the amounts of the functional groups (carboxyl group and amino group) contained in the polyol.

Example 17

Preparation of Ink Liquid (y)

Ink liquid (y) was prepared in the same manner as in Example 1 except that the anionic self-emulsifying ether polyurethane was changed to an anionic self-emulsifying ether polyurethane having an acid value of 120 mgKOH/g (manufactured by Mitsui Chemicals, Inc.).

Notably, the anionic self-emulsifying ether polyurethane having an acid value of 120 mgKOH/g was synthesized by reacting a diisocyanate compound with a polyol containing a polyether diol as a main component. The acid value was adjusted by controlling the amounts of the functional groups (carboxyl group and amino group) contained in the polyol.

Using an inkjet printer MJ-930C (manufactured by EPSON), each of the above-prepared ink liquids was used to print PPC paper 4024 sheets (manufactured by Fuji Xerox Co., Ltd.) and evaluated for jetting stability and image density. In addition, each ink liquid was also evaluated for ink liquid storage stability. Here, the image density was measured with an Xrite densitometer (X-rite 938, manufactured by X-rite Co.), and the ink liquid storage stability was tested as follows. The evaluation results are shown in Table 1.

—Image Density—

The solid image of each image sample was measured with the Xrite densitometer, and the measurements were evaluated according to the following criteria.

A: 1.5≤Image Density
B: 1.4≤Image Density<1.5
C: 1.2≤Image Density<1.4
D: Image Density<1.2

—Jetting Stability—

After printing, the printer was left to stand for 1 month at 40° C. with the printer head being capped. Evaluation was then made to find out whether or not the printer, after standing for 1 month, could recover to its initial jetting state. The evaluation was made as to the number of cleaning operations needed to recover to the initial jetting state.

A: Recovered with 1 cleaning operation
B: Recovered with 2 to 3 cleaning operations
C: No recovery even with 3 or more cleaning operations —Storage Stability—

Each ink was put into a polyethylene container, tightly sealed, and stored for 3 weeks at a temperature of 70° C. After the storage, the properties of particle diameters, surface tension, and viscosity were measured and evaluation was made as to the amount of change observed from the initial property states in the following manner.

A: Particle diameter, surface tension and viscosity all changed less than 5%
B: Particle diameter, surface tension and viscosity all changed less than 10%
C: Particle diameter, surface Tension and viscosity all changed less than 30%
D: At least one of particle diameter, surface tension and viscosity changed 30% or more

TABLE 1

|  |  | Image Density on Plain Paper | Jetting Stability | Storage Stability |
|---|---|---|---|---|
| Ex. 1 | Ink Liquid (a) | A | A | A |
| Ex. 2 | Ink Liquid (b) | B | A | A |
| Ex. 3 | Ink Liquid (c) | A | A | B |
| Ex. 4 | Ink Liquid (g) | B | A | B |
| Ex. 5 | Ink Liquid (h) | A | A | B |
| Ex. 6 | Ink Liquid (i) | A | A | B |
| Ex. 7 | Ink Liquid (o) | A | B | A |
| Ex. 8 | Ink Liquid (p) | A | A | B |
| Ex. 9 | Ink Liquid (q) | A | A | B |
| Ex. 10 | Ink Liquid (r) | A | A | A |
| Ex. 11 | Ink Liquid (s) | B | A | A |
| Ex. 12 | Ink Liquid (t) | B | A | A |
| Ex. 13 | Ink Liquid (u) | A | A | B |
| Ex. 14 | Ink Liquid (v) | A | A | A |
| Ex. 15 | Ink Liquid (w) | A | A | A |
| Ex. 16 | Ink Liquid (x) | A | A | A |
| Ex. 17 | Ink Liquid (y) | A | A | A |
| Comp. Ex. 1 | Ink Liquid (d) | D | C | D |
| Comp. Ex. 2 | Ink Liquid (e) | B | B | B |
| Comp. Ex. 3 | Ink Liquid (f) | C | B | B |
| Comp. Ex. 4 | Ink Liquid (j) | B | B | B |
| Comp. Ex. 5 | Ink Liquid (k) | A | B | C |
| Comp. Ex. 6 | Ink Liquid (l) | A | B | C |
| Comp. Ex. 7 | Ink Liquid (m) | B | B | B |
| Comp. Ex. 8 | Ink Liquid (n) | A | B | B |

| Reference Sings List | |
|---|---|
| 20: | Ink cartridge |
| 42: | Liquid absorber |
| 43: | Case |
| 44: | Upper covering member |
| 45: | Liquid-supplying port |
| 46: | Seal ring |
| 47: | Atmosphere-opened port |
| 48: | Groove |
| 49: | Cartridge housing |
| 50: | Cap member |
| 51: | Liquid leakage-preventing protrusion |
| 55: | Seal member |
| 71: | Cartridge-positioning portion |
| 81: | Cartridge-detaching protrusion |
| 81a: | Cartridge-detaching hook |
| 82: | Cartridge-detaching dent |
| A: | Space |

The invention claimed is:

1. An inkjet recording ink comprising:
a pigment dispersion liquid, comprising a first carbon black and a dispersant,
a second carbon black,
a penetrant,
a wetting agent,
a polyoxyalkylene derivative of the formula:

$C_{18}H_{27}(C_2H_4O)_nH$, wherein n is from 8 to 9, and
water,
wherein
the first carbon black has an average particle diameter D50 of from 70 nm to 180 nm as measured by a dynamic light scattering method and has a particle diameter standard deviation equal to or smaller than ½ of the average particle diameter,
the dispersant is a condensate of naphthalene sulfonic acid and formalin,
the second carbon black is carbon black coated with a resin, and
the penetrant is 2-ethyl-1,3-hexandiol.

2. The inkjet recording ink of claim 1, further comprising an aqueous polyurethane resin.

3. The inkjet recording ink of claim 2, wherein the aqueous polyurethane resin is an anionic self-emulsifying ether polyurethane.

4. The inkjet recording ink of claim 2, wherein the aqueous polyurethane resin has an acid value of from 40 mgKOH/g to 120 mgKOH/g.

5. The inkjet recording ink of claim 1, wherein an amount of 2-ethyl-1,3-hexandiol in the ink is from 0.1% by mass to 10% by mass.

6. The inkjet recording ink of claim 5, wherein the amount of 2-ethyl-1,3-hexandiol in the ink is from 1.5% by mass to 5.0% by mass.

7. The inkjet recording ink of claim 1, wherein a ratio by mass of the dispersant to the first carbon black is from 0.1 to 2.

8. The inkjet recording ink of claim 1, wherein an amount of the wetting agent in the ink is from 5% by mass to 40% by mass.

9. An ink cartridge comprising:
an inkjet recording ink, and
a container,
wherein the inkjet recording ink is housed in the container,
wherein the inkjet recording ink comprises a pigment dispersion liquid comprising a first carbon black and a dispersant, a second carbon black, a penetrant, a wetting agent, and water,
the first carbon black has an average particle diameter D50 of from 70 nm to 180 nm as measured by a dynamic light scattering method and has a particle diameter standard deviation equal to or smaller than ½ of the average particle diameter,
the dispersant is a condensate of naphthalene sulfonic acid and formalin,
the second carbon black is carbon black coated with a resin,
the penetrant is 2-ethyl-1,3-hexandiol, and
the inkjet recording ink comprises a polyoxyalkylene derivative of the formula:

$C_{18}H_{27}(C_2H_4O)_nH$, wherein n is from 8 to 9.

10. The ink cartridge of claim 9, wherein the inkjet recording ink further comprises an aqueous polyurethane resin.

11. The ink cartridge of claim 10, wherein the aqueous polyurethane resin is an anionic self-emulsifying ether polyurethane.

12. The ink cartridge of claim 10, wherein the aqueous polyurethane resin has an acid value of 40 mgKOH/g to 120 mgKOH/g.

13. The ink cartridge of claim 9, wherein an amount of 2-ethyl-1,3-hexandiol in the ink is from 0.1% by mass to 10% by mass.

14. The ink cartridge of claim 13, wherein the amount of 2-ethyl-1,3-hexandiol in the ink is from 1.5% by mass to 5.0% by mass.

15. The ink cartridge of claim 9, wherein a ratio by mass of the dispersant to the first carbon black in the ink is from 0.1 to 2.

16. The ink cartridge of claim 9, wherein an amount of the wetting agent in the ink is from 5% by mass to 40% by mass.

* * * * *